W. C. GAYTON.
Window Cleaner.
No. 202,101. Patented April 9, 1878.
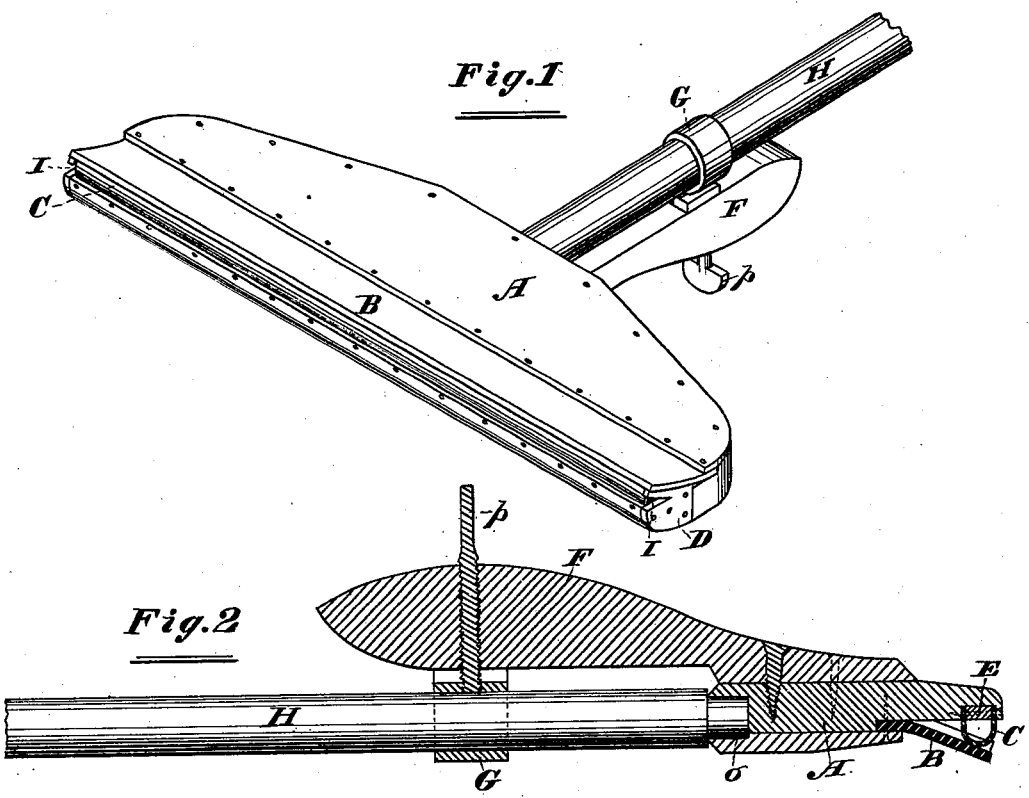
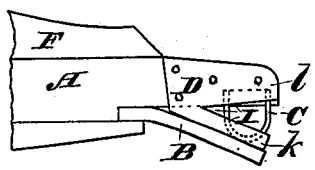
Attest:
W. T. Baker
C. R. Baker
INVENTOR:
William C. Gayton,
By R. C. Dyrenforth
Attorney.

UNITED STATES PATENT OFFICE.

WILLIAM C. GAYTON, OF CHICAGO, ILLINOIS.

IMPROVEMENT IN WINDOW-CLEANERS.

Specification forming part of Letters Patent No. 202,101, dated April 9, 1878; application filed February 8, 1878.

*To all whom it may concern:*

Be it known that I, WILLIAM C. GAYTON, of the city of Chicago, in the county of Cook and State of Illinois, have invented certain new and useful Improvements in Window-Cleaners; and I hereby declare the following to be a full, clear, and exact description thereof, reference being had to the accompanying drawing, of which—

Figure 1 is a perspective view; Fig. 2, a sectional view, and Fig. 3 a detail view.

My present invention relates to several important improvements on my former invention in window-cleaners, for which Letters Patent of the United States No. 196,006 were granted to me October 9, 1877.

These improvements consist, first, in the construction of the elastic cushion; secondly, in forming the rubber end pieces with a notch, whereby they acquire a yielding character similar to that of the elastic cushion; and, thirdly, in attaching to the cleaner a removable handle, and in the means therefor, all as hereinafter more fully set forth.

In the drawing, A is the wooden body or holder; B, the rubber strip, whose outer edge comes in contact with the pane of glass; C, the elastic cushion beneath the strip B; and D D the end plates, of thick rubber, the office of each of which is fully explained in the specification of my former patent above referred to.

In that patent the elastic cushion was shown as consisting of a piece of rubber tubing, fastened to the wood in a novel manner by means of wires. I now construct it out of a flat strip of rubber in the following manner: Close to the edge of the wooden body or holder, and extending throughout the length thereof, I cut a square groove. I then bend the flat strip into the form of a half-tube, C, and set the edges down into the groove to the bottom of the same. E is a wooden strip, of just the dimensions requisite to fill the groove after the rubber has been inserted and wedge the latter tightly. This strip is pushed into position from the end, and it may be secured in place and to the sides of the rubber by being previously coated with glue, or by means of nails driven through it laterally from the outer edge of the holder, or both. It is advisable, for obvious reasons, also to coat the sides of the groove with glue before introducing the edges of the arched strip C.

This mode of forming the elastic cushion is much easier and cheaper than that with the rubber tube, while the cushion so formed is in every respect as effective as the other.

The rubber end plates D are for the purpose of affording a suitable backing to the strip B where it enters the corners of the sash. My present improvement in these end plates lies in the deep gap or notch I which I cut in each from its top. The branch $k$, in juxtaposition to the strip B, yields under pressure until it brings up against the fixed branch $l$ on the opposite side of the gap as the said gap closes. This change, slight as it appears, produces a great improvement in the work done at the edges of the pane.

I find it advantageous to have means for attaching a long handle to the cleaner in such manner that it may be readily detached at will, in order that, when it becomes necessary to clean high windows (as those of stores, for example) from the ground, a step-ladder or like aid may be dispensed with. In this case the windows should all first be polished to a point where the end of the handle touches the ground, and then the handle detached and the operation completed with the device immediately in the hand. Naturally the handle cannot be inclined outward after its end has reached the ground, as this would bring, instead of the rubber, the wood of the holder against the glass; but if the windows are exceptionally high, a long handle may first be employed, then a shorter one substituted for it, and finally the device held immediately in the hand, as aforesaid.

I attach and detach the handle by means of the following-described device: F is the short handle attached to each cleaner, and which has a hole through it for the passage of the clamp-screw $p$. G is a ring, which is screwed upon the clamp-screw $p$ on the under side of the holder F, and through this ring G the handle H is passed, the end of the latter being adapted to enter the recess or eye $o$ at the back of the holder A. The handle H is clamped against the lower side of the ring G by turning the clamp-screw $p$. If preferred, the ring G may, when adjusted in position, sit within a transverse recess formed in the under side of the handle F.

As stated in the specification of my former patent, my device is for drying and polishing windows after they have been washed. The edge of the rubber strip B is pressed against the pane and drawn once across downward, and this leaves the glass clear, bright, and free from moisture.

What I here claim as new, and desire to secure by Letters Patent, is—

1. The elastic cushion formed of the rubber strip C, doubled over in the form of an arch and set into the square-cut groove in the holder A, as described, and held in place by the wooden strip E, substantially as set forth and shown.

2. The end plates D, of rubber, forming a backing or cushion for the strip B at the extremities of the holder, and provided each with the notch or gap I, for the purpose set forth.

3. The combination, as a fastening for the handle H, of the ring G, eye $o$ in the holder, and clamp-screw $p$, passing through both the handle F and ring G, substantially as described.

4. The window-cleaning device, consisting of the combination of the following elements, viz: the body A, rubber strip B, elastic cushion C, rubber end plates D, fixed handle F, and removable handle H, substantially as described.

WILLIAM C. GAYTON.

In presence of—
ROBERT E. SHIMMIN,
MICHL. PETRIE.